No. 694,680. Patented Mar. 4, 1902.
E. W. SHEPHERD.
TRAP.
(Application filed May 6, 1901.)
(No Model.)
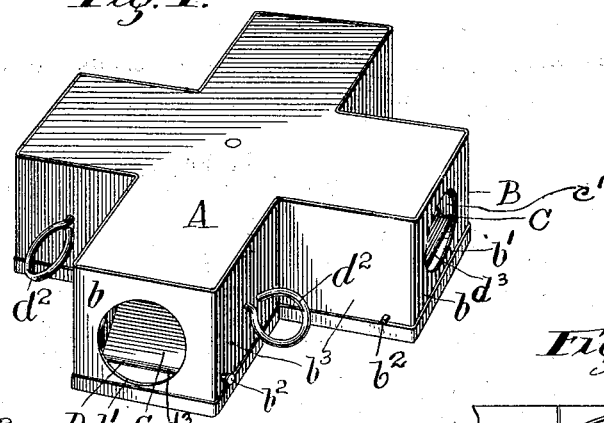
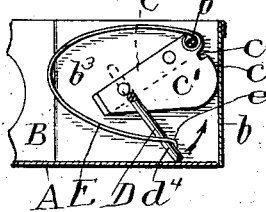
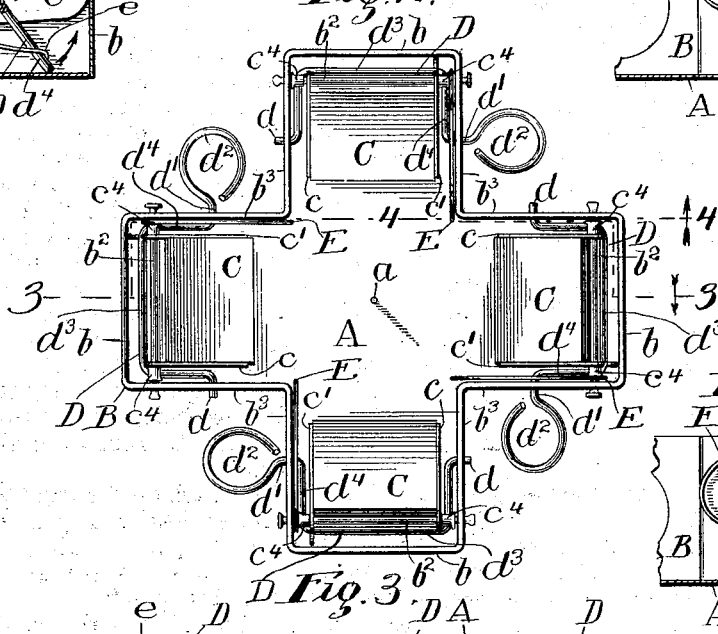
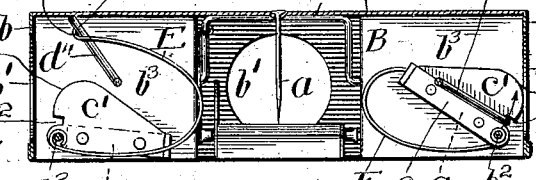
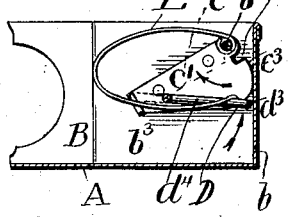
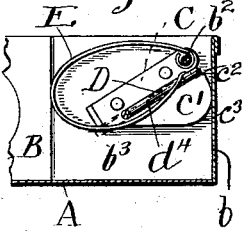
Witnesses:
Chas. O. Shurvey,
S. Bliss.
Inventor,
Edwin W. Shepherd
by Wilkinson & Fisher
Attys.
THE NORRIS PETERS CO., PHOTO-LITHO., WASHINGTON, D. C.

UNITED STATES PATENT OFFICE.

EDWIN W. SHEPHERD, OF CHICAGO, ILLINOIS.

TRAP.

SPECIFICATION forming part of Letters Patent No. 694,680, dated March 4, 1902.

Application filed May 6, 1901. Serial No. 58,901. (No model.)

*To all whom it may concern:*

Be it known that I, EDWIN W. SHEPHERD, a citizen of the United States of America, residing at Chicago, in the county of Cook and State of Illinois, have invented certain new and useful Improvements in Traps, of which the following is a specification.

My invention relates to certain improvements in traps designed more especially for the purpose of catching small animals—such as mice, &c.; and to such end it consists in certain novel features of construction, a description of which will be found in the following specification and the essential characteristics more definitely pointed out in the claims.

In the drawings furnished herewith, Figure 1 is a perspective view of the complete trap. Fig. 2 is an under plan of the same. Fig. 3 is a vertical cross-section taken in the broken line 3 3 of Fig. 2; and Figs. 4, 5, and 6 are vertical cross-sections in the line 4 4 of Fig. 2, illustrating the method of setting the trap.

In these views the frame of the trap will be seen to consist of a top A, preferably formed in the shape of a cross, and to its edges is secured, either by soldering or by other suitable means, an inclosing wall B. In each of the four arms of the cross thus formed is arranged the operating mechanism of the trap, and a pin $a$ is secured to the top piece A, upon which bait may be placed, this pin being centrally located, so that but one piece of bait will be necessary in the use of the trap.

In the end faces $b$ of the wall B are formed openings $b'$, and within each arm of the trap is a hinged platform C, upon which the animal must tread in order to reach the bait upon the pin $a$. As shown, these swinging platforms have secured upon two ends plates $c\ c'$, extending beyond the edge of the platform and through which pins $b^2$ are passed, which pins are secured in the side walls $b^3$ of the frame, sleeves $c^4$ encircling the pins between the plates $c\ c'$ and the side walls $b^3$ to properly position the platform. Yoke-shaped latches or jaws D are journaled in the side walls $b^3$ at $d\ d'$ and provided without the same at one end with handles $d^2$. The connecting member $d^3$ of each of these yoke-shaped latches is normally held against the top A of the trap by a U-shaped spring E, one end of which is looped around the pin $b^2$ and the other hooked against one leg $d^4$, as seen at $e$. The plates $c'$ of the platforms are formed with notches $c^2$ and curved faces $c^3$, the notches serving to engage the latches when the trap is set, as will appear below.

The setting of the trap is accomplished by inverting it, as seen in Figs. 2, 4, 5, and 6, and by turning the handles $d^2$ of the latches D from a position seen in Fig. 4 to that seen in Fig. 6. The platform, being free to swing upon its pivot, assumes the position seen in Fig. 4, and as the member $d^3$ of the latch reaches the position seen in Fig. 5 it swings the platform in the direction indicated by the arrow thereon as the member $d^3$ rides up the curved face $c^3$ of the plate $c'$ until the member $d^3$ reaches the notch $c^2$ when the platform drops down again into the position seen in Figs. 4 and 6. The pivots of the latch and platform are so arranged that the tension of the spring upon the latches while in engagement with the notches is to push upon the plates $c'$ in a line approximately at right angles to the plane of the platform, and as long as the push is in this direction the latches will remain in engagement with the notches. All of the latches being set in this position, the trap may be laid upon a suitable support ready for use.

In Fig. 3 the latch on the right is set, while the one on the left has been sprung. In order to reach the bait upon the pin $a$, the animal must enter one of the openings $b'$ and tread upon the swinging platform C. As soon as any pressure is applied to the platform it will swing upon its pivot and swing the notch $c^2$ out of engagement with the latch D, which when released from said notch will immediately be swung in the direction indicated by the arrow thereon in Fig. 3, catching the animal between it and the top A.

One of the main advantages of this trap is the great ease with which it may be set, it being at the same time very sensitive. Moreover, the bait is located at such a distance from the opening that it is never reached by the animal, as the trap is sprung as soon as the swinging platform is trod upon. This obviates the necessity of baiting each separate compartment, as is usually the case in traps of this class, the one piece of bait serving for all.

More or less variation of the different parts is possible, and I do not, therefore, desire to limit myself to their specific construction.

I claim as new and desire to secure by Letters Patent—

1. In a trap, the combination with a spring-pressed latch, of a swinging platform, and a plate secured upon said platform having a notch adapted for engagement with the latch to hold the same against the action of the spring when in one position, but to release said latch when moved away from such position; substantially as described.

2. In a trap, the combination with a spring-pressed latch, of a swinging platform and a plate secured thereto, containing a notch for engagement with the latch against the action of the spring, the tension of the spring when the latch is in engagement with the notch being in a line approximately at right angles to the plane of the platform and passing through the pivot thereof; substantially as described.

3. In a trap, an inclosing frame, an opening in said frame, a bait-pin, a spring-pressed latch between the opening and bait-pin, and a swinging platform adjacent to the opening in engagement with the latch but adapted to release the same when moved in one direction; substantially as described.

4. In a trap, the combination with a suitable frame and a spring-pressed jaw pivoted thereon, having a laterally-extending handle by means of which it may be set, of a tripping-platform arranged to automatically engage and lock the jaw when the latter is brought into the set position; substantially as described.

5. In a trap, the combination with a frame and spring-pressed jaw pivoted thereon and having a laterally-extending handle for setting, of a tripping-platform arranged to be tripped by the weight of the animal when the trap is right side up, and to automatically engage and hold the jaw when wrong side up; substantially as described.

In witness whereof I have hereunto set my hand, at Chicago, in the county of Cook and State of Illinois, this 29th day of April, A. D. 1901.

EDWIN W. SHEPHERD.

Witnesses:
CHAS. O. SHERVEY,
S. BLISS.